C. RAGAN.
TIRE INFLATOR.
APPLICATION FILED JULY 23, 1913.
1,103,833.
Patented July 14, 1914.
2 SHEETS—SHEET 1.
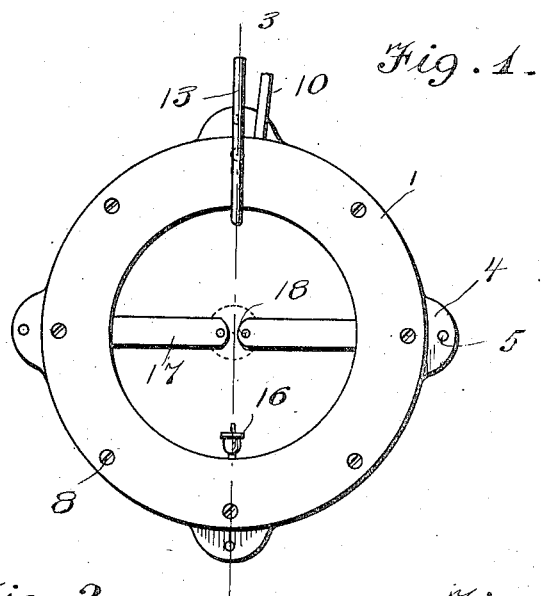
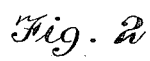
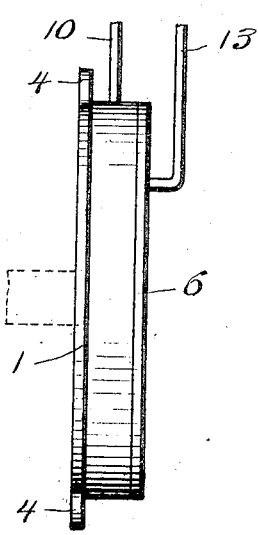
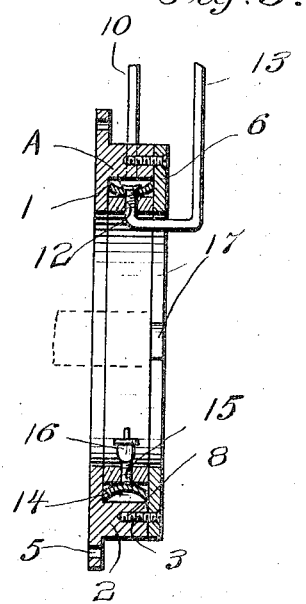
Inventor
Charles Ragan
Attorney

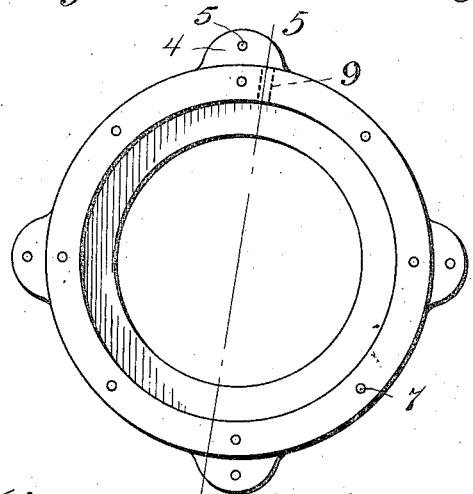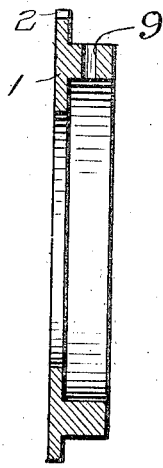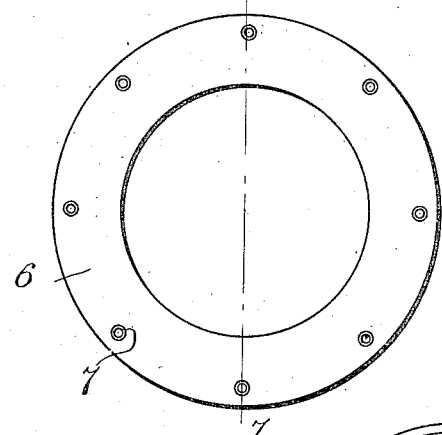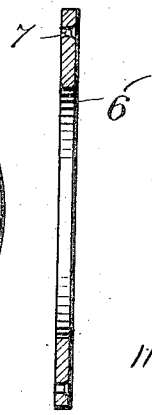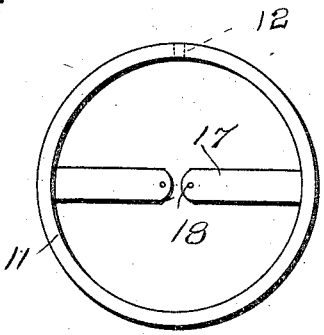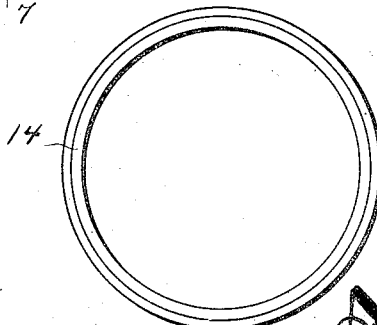

UNITED STATES PATENT OFFICE.

CHARLES RAGAN, OF BUFFALO, NEW YORK.

TIRE-INFLATOR.

1,103,833.  Specification of Letters Patent.  Patented July 14, 1914.

Application filed July 23, 1913. Serial No. 780,842.

*To all whom it may concern:*

Be it known that I, CHARLES RAGAN, a citizen of the United States, residing at Buffalo, in the county of Erie and State of New York, have invented certain new and useful Improvements in Tire-Inflators; and I do hereby declare the following to be a full, clear, and exact description of the invention, such as will enable others skilled in the art to which it appertains to make and use the same.

This invention relates to new and useful improvements in automobile tire inflating devices, and has for its object the provision of a device of the above character, which is adapted to inject air into the tires of a motor vehicle, when said vehicles are running.

Another object of my invention is the provision of a device of the above character, which may be easily and quickly applied to the ordinary type of motor vehicle wheel without materially changing the construction of the same.

Still another object of my invention is the provision of such a device, which may be thrown into and out of operation at will of the driver without the necessity of stopping the car.

With the above and other objects in view I now proceed to describe my invention in the following specification, and accompanying drawings, in which—

Figure 1 is a plan view of my improved tire inflator, Fig. 2 is an edge view of the same, Fig. 3 is a longitudinal sectional view taken on line 3—3 of Fig. 1, Fig. 4 is a plan view of my improved inflator, showing the same as it would appear when looking at the side opposite Fig. 1, Fig. 5 is a longitudinal sectional view of the casing, which is used in the construction of my inflating device, Fig. 6 is a plan view of the plate used in conjunction with my inflating device, Fig. 7 is a longitudinal sectional view taken on line 7—7 at Fig. 6, Fig. 8 is a total view of the inner ring, and Fig. 9 is a total view of the packing.

Referring to the drawings and the numerals of reference, 1 indicates the main ring forming a body portion of my improved inflating device. This ring has formed thereon and extending outwardly therefrom the flange 2, which is provided with laterally screw threaded apertures 3, the use of which will be more fully hereinafter described.

Suitable lugs 4 are formed integral with the outer periphery of the ring 1 and are provided with the apertures 5 by means of which the device is adapted to be secured to the wheel of the motor vehicle. These lugs 5 are preferably positioned at diametrically opposite points around the periphery of the ring and are equally distanced from each other, as will be clearly seen upon referring to the drawings.

A coöperating ring 6 of substantially the same dimensions as the ring 1 is provided with the apertures 7. These apertures 7 are preferably located in such a manner that they register with the apertures 3 formed in the annular flange 2, suitable screws 8 are adapted to be inserted through the apertures 7 and into the apertures 3 and thereby hold the ring 6 in position on the ring 1, as is clearly illustrated in Figs. 2 and 3. The flange 2 formed on the ring 1 is preferably provided with the aperture 9, which extends radially therethrough and is adapted to receive the air outlet pipe 10, which is connected to the valve of a vehicle tire by any suitable means. The internal ring 11, which is used in conjunction with the rings 1 and 6 is provided with the internally screw threaded aperture 12 which is adapted to receive the end of the pipe 13, which in turn leads to a suitable source of air supply. The packing ring 14 is preferably segmental in cross section, as will be clearly seen upon referring to Fig. 3, and its lateral edges are adapted to fit snugly between the rings 1 and 6, this packing ring being adapted to form an air tight chamber between the flange 2 and the ring 11, which extends annularly around the outer periphery of the ring 11. A suitable aperture 15 is provided in the ring 11 and is adapted to receive the screw threaded shank of the lubricating device indicated by the numeral 16, which is adapted to keep the parts sufficiently oiled and thereby prevent undue wear, which may cause leakage of the air during the time the tire is being inflated. Formed integral with the ring 11 and extending inwardly with relation thereto I preferably provide the arms 17, which are substantially diametrically opposite each other and are provided with the apertures 18 by means of which said arms are adapted to be secured to the axis of the vehicle upon which the device is being used.

It will be clearly seen from the foregoing that with my improved inflating device, the tires of a motor vehicle may be pumped at all times regardless as to whether or not the said vehicle is running. It will be obvious that the air entering through the pipe 13 and the stationary ring 11 will pass into the annular chamber A, which being provided with the outlet 9 formed in the outer ring 1, will permit the air contained in the chamber to flow outwardly through the pipe 10 and into the tire of the vehicle. Thus it will be seen that the tire may be inflated regardless as to what position the wheel may be in and also without regard as to whether or not said wheel is in motion.

While in the foregoing I have shown and described the preferred embodiment of my invention, I wish it to be understood that I may change the specific arrangements of parts without in any way departing from the spirit and scope of my invention as defined by the appended claim.

Having thus described my invention, what I claim is:

In a device of the character described a ring, an annular extension formed on said ring, said annular extension being of less thickness than the width of the ring and having screw receiving apertures in the periphery thereof, said annular extension also having an outlet aperture in the periphery thereof, ears formed integral with the ring and extending outwardly therefrom to provide means to connect the ring to the spokes of a vehicle wheel, an inner rotatable ring mounted within the annular extension and spaced therefrom to form a chamber, said inner rotatable ring having an air inlet aperture therein, arms at diametrically opposed points extending into the ring and forming a means to secure said ring to the axle of a vehicle, a cover plate having screw receiving apertures therein, adapted to register with the internally screw threaded apertures in the annular extension, and a packing ring secured to the rotatable ring and adapted to frictionally engage the side walls of the chamber to prevent air leakage when the device is in use.

In testimony whereof I affix my signature in presence of two witnesses.

CHARLES RAGAN.

Witnesses:
 JOHN CRAY,
 THOMAS CRAY.